Jan. 14, 1964   V. GAVREAU ETAL   3,118,096
AUTOMATIC REMOTE POSITION CONTROL SYSTEM
Filed Dec. 14. 1959   4 Sheets-Sheet 1

INVENTORS
VLADIMIR GAVREAU, ALBERT
CALAORA & MARCEL MIANE
BY
*Larson and Taylor*
ATTORNEY

V. GAVREAU ETAL 3,118,096

AUTOMATIC REMOTE POSITION CONTROL SYSTEM

Filed Dec. 14, 1959

INVENTOR

BY

ATTORNEY

Jan. 14, 1964 V. GAVREAU ETAL 3,118,096
AUTOMATIC REMOTE POSITION CONTROL SYSTEM
Filed Dec. 14, 1959 4 Sheets-Sheet 4

INVENTOR
VLADIMIR GAVREAU, ALBERT
CALAORA & MARCEL MIANE
BY Larson and Taylor
ATTORNEY

United States Patent Office 3,118,096
Patented Jan. 14, 1964

3,118,096
AUTOMATIC REMOTE POSITION
CONTROL SYSTEM
Vladimir Gavreau, Albert Calaora, and Marcel Miane, all of Marseille, France, assignors to Centre National de la Recherche Scientifique, Paris, France, a corporation of France
Filed Dec. 14, 1959, Ser. No. 859,385
Claims priority, application France Dec. 18, 1958
12 Claims. (Cl. 318—28)

The present invention has for its object an improved device adapted to provide completely automatic working or remote control, and at high speed, of the operation cycles of machine-tools.

In a machine-tool such as a lathe or milling machine, the position of the tool or of the part to be machined is determined by its co-ordinates. If the cranks, lead-screws and traversing rods of the machine-tool are connected mechanical revolution counters of the speed-counter type, these co-ordinates can be read directly on the revolution counters or speed-counters (cartesian co-ordinates in the case of a lathe or of a chuck-plate of an ordinary milling-machine; polar co-ordinates in the case of a rotating chuck-plate).

Although the counters used do not determine a speed but a number of revolutions, i.e. a position, they are called in the present specification and appended claims as well "speed-counters" as revolution counters as they are similar to some speed-counters as concerns their driving means.

The work of a machine-tool can therefore be rendered automatic by driving its cranks, lead-screws and other control units, by means of auxiliary motors, clutches, etc., and by controlling their rotation by means of speed-counters with electrical, photo-electric or magnetic reading.

An automatic system of this kind can therefore be carried into effect by employing a program-drum, or a perforated paper tape, or alternatively a recording of control signals on a magnetic tape. The program of successive movements of the tool required for machining a given part and which thus takes the form of a drum of the contact cam type or of a perforated sheet of paper, for example, can thus be obtained in two different ways:

(1) Either directly from a drawing showing the dimensions of the part to be machined;

(2) Or even better, by having a first work-piece machined by an operator, and by progressively taking note of the indications of the different speed-counters.

This latter method of operation has the advantage of taking into account the defects of the machine-tool (such as the irregular action of the lead-screw) and eliminates such defects automatically. The second method also makes it possible to avoid the preliminary adjustment of the different tools, which is always very long and difficult.

It is obvious that the speed and precision of a machine-tool control of this type necessarily depends on the speed-counters employed.

The present invention has thus for its essential object improvements made in the operation and remote control of machine-tools by mechanical speed-counters having either electrical, photo-electric or magnetic reading.

In accordance with the present invention there are employed for the automation of machine-tools, rapid speed-counters with step by step movement of the figure-drums and the reading parts (contact-studs, cams, optical or magnetic elements, etc.) are disposed directly on these figure-drums; the indications of a speed-counter of this type are then read by means of fixed reading devices such as multiple electrical contacts (or photoelectric or magnetic reader units). Generally speaking, these speed-counters are decimal speed-counters. But the readings of said speed-counters can, in accordance with the present invention, be either binary or decimal: in the first case, 4 peripheral control-bands (for example 4 lines of cams) are provided for each decimal order (that is to say 4 lines for the units, 4 lines for the tens, 4 lines for the hundreds, 4 lines for the thousands, etc.) and as many fixed reading units (for example electrical contact blades) as there are peripheral bands, that is 4 per decimal order; for decimal reading, 5 peripheral control-bands are employed and twice the number of fixed reader units (namely 10) for each decimal order: each control unit then actuates successively two diametrically-opposite fixed reader units.

When the figure-drums of the speed-counter employed are too narrow to comprise more than two peripheral control bands, it is only necessary to employ two or more speed-counters in parallel, that is to say actuated simultaneously by the same shaft of the machine-tool, the movements of which they control.

A device in accordance with the present invention, for the automatic control and the remote control of a machine-tool with a view to carrying out the machining of a work-piece by successively displacing respectively at least one tool with respect to said piece and also said piece with respect to the tool, comprises at least one speed-counter which marks the possible positions of said tool with respect to said piece, a control unit serving to pre-determine the successive positions which should be taken up by said tool with respect to said piece on completion of each displacement, driving means for displacing said tool with respect to said piece towards the position corresponding to the indications supplied by said control unit, and means for stopping with precision the displacements of said tool with respect to said piece, when the indications of said speed-counter are identical to those of said control unit, and characterized in that the speed-counters are of the drum type with step by step movement carrying, for each decimal order, less than ten peripheral control bands, preferably four to five peripheral bands, each generally comprising ten zones, certain zones being of a first type whilst the others are of a second type, and in that fixed reading units of the zones co-operate with said speed-counters, the number of said reading units being at least equal to the number of said peripheral bands, each of said reading units being designed so as to actuate an electrical circuit when a zone of first type passes in front of said reading unit.

It is useful to note that the present invention, which relates to control by speed-counters, has nothing in common with the known methods of control by impulses which employ impulse-counters. It is the positions of the cam-contacts on a generator line of the program-drum or the positions of the holes on the perforated paper which are automatically compared with the indications of the speed-counters and produce the successive displacements of the machine-tool which is controlled with respect to the machined part. And when a magneto-phone control is employed in the present invention, impulses are not recorded (so as to avoid the risk of untimely control by a stray impulse or by a badly-reproduced impulse), but there are recorded instead musical currents of different frequencies, by employing "telephone numerator buttons" of the type usually employed to replace telephone calling dials. It is of course understood that, without departing from the scope of the present invention, it is also possible to employ a tape recorder having a number of channels and a number of recording heads, which thus makes it possible to employ a single frequency and to avoid the use of electrical filters during the reproduction.

In order that the present invention may be better understood, there will be described in more detail below the construction of improved rapid speed counters for the control of machine-tools and their application to the automatic operation of a machine-tool, it being perfectly understood that the description which follows below is given by way of example and not in any sense by way of limitation.

Finally.

In order to carry out automatic control or remote control of the spindles or shafts of a machine-tool such as a lathe to be driven at high speed while still permitting the marking of the successive positions of said shafts, there are employed, in accordance with the principal feature of the invention, speed-counters having low inertia and which can therefore rotate at high speed without difficulty.

Figure 1:
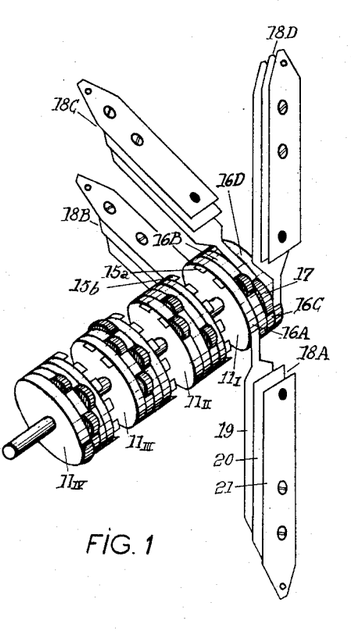
FIGS. 1 to 3 illustrate respectively in perspective, in transverse cross-section and in elevation, a mechanical speed-counter with its four contacts per decimal order, intended to mark the possible positions of a tool or of a part to be machined, in a device in accordance with the present invention, for the automatic control or remote control of a machine-tool.
Figure 2:
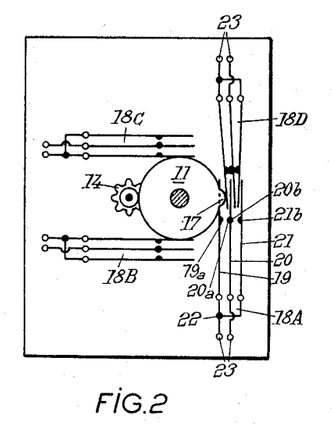
Figure 3:
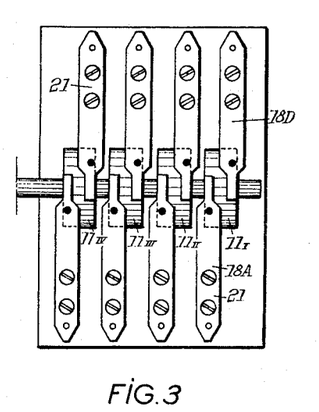

The speed-counters or revolution counters in accordance with the present invention, one example of which is illustrated in FIGS. 1 to 3, are of the mechanical type with step by step drive (similar to those employed as mileage indicators in automobile vehicles) and they comprise for each decimal order a drum having the figures 11: respectively $11_I$, $11_{II}$, $11_{III}$, $11_{IV}$ for the order of the units, tens, hundreds and thousands, the unit drum $11_I$ being driven continuously and not in steps by means of an ordinary gear from the crank or the shaft of the machine-tool, the movement of which is controlled by said drum.

When the unit drum $11_I$ has completed a full revolution (not in steps) it causes the tens drum $11_{II}$ to move round suddenly by $\frac{1}{10}$ of a turn. And after each revolution of the tens drum $11_{II}$, the hundreds drum $11_{III}$ suddenly moves round by $\frac{1}{10}$ of a turn. In the same manner, upon completion of each revolution of the hundreds drum $11_{III}$, the thousands drum $11_{IV}$ suddenly moves round for $\frac{1}{10}$ of a revolution. These limited rapid displacements of consecutive drums are obtained by a known method, by means of a star-wheel with 8 teeth, 4 of which are partially cut away, shown at 14 in FIG. 1. The said star-wheel engages on the one hand the two teeth $15a$ of a figure drum (for example the unit drum) at the end in which the four teeth out of eight of the star-wheel are cut away (this taking place once for every revolution of the unit drum only) and engages on the other hand with the twenty teeth $15b$ of the following figure-drum (for example the tens drum) at the end in which the eight teeth of the star-wheel are complete, thus producing rotations of $\frac{1}{10}$ of a revolution of this latter figure-drum for each complete revolution of the previous drum. In FIG. 1 there can be seen the two and the twenty teeth of the figure drums $15a$, $15b$ which engage the star-wheel 14 of FIG. 2.

Each drum 11 comprises four peripheral bands 16A, 16B, 16C, 16D (by being constituted for example by four thick discs rigidly fixed by any known means) and each band comprises two types of long zones each having a length of $\frac{1}{10}$ of a revolution: for example zones which project in the shape of cams or bosses 17 and non-projecting zones, as shown in FIG. 1. These cams 17 co-operate with fixed sets of contacts, namely a set of contacts 18A, 18B, 18C, 18D for each peripheral band 16A, 16B, 16C, 16D respectively; in FIG. 1 there has been shown only the set of contacts which co-operates with the relays of the units $11_I$.

Figure 4:
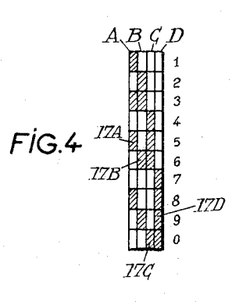
FIGS. 4 and 5 show the positions of the cams or bosses on the developed lateral surface of an indicator drum with figures of any decimal order, forming part of a mechanical speed-counter of the type previously mentioned, respectively with and without angular displacement of the electrical contacts actuated by said cams.

Each set of contacts is usefully provided, as shown in FIG. 2, with three parallel strips 19, 20, 21, the central strip 20 carrying two contacts $20a$ and $20b$, whilst the internal strip 19 and the external strip 21 each carries a contact, $19a$ and $21b$, respectively, said contacts being intended to co-operate with the contact $20a$ and the contact $20b$ respectively; the strips 19 and 21 of a same set are electrically connected at 22. This double contact system ensures safety of operation by guaranteeing faultless closure of the contacts. The presence of a boss 17 at the level of one set of contacts 18 ensures the closure of the circuit between the points 23, as shown in the case of the set of contacts 18D in FIG. 2. In order to show the ten possible positions of each drum 11 by means of only four circuits by decimal order, there is employed a particular arrangement of the bosses or cams 17 on the four peripheral bands 16 of a figure drum, for example of the type shown in FIG. 4 in which the bands are shown developed flat and the cams are illustrated by shaded rectangles, and in which:

Position 1 of the figure drum corresponds to the closure of the double contacts of series A,
Position 2 corresponds to the closure of the contacts of series B,
Position 3 corresponds to the closure of the contacts of series A and of series B,
Position 4 corresponds to the closure of the contacts of series C,
Position 5 corresponds to the closure of the contacts of series A and C,
Position 6 corresponds to the closure of the contacts of series B and C,
Position 7 corresponds to the closure of the contacts of series D,
Position 8 corresponds to the closure of the contacts of series A and D,
Position 9 corresponds to the closure of the contacts of series B and C,
Position 0 corresponds to the closure of the contacts of series C and D.

Figure 5:
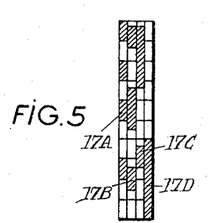

By virtue of the fact that, in order to facilitate the housing of said contacts, the sets of contacts 18B and 18C of the two central bands have been angularly displaced as shown, by a quarter of a turn forwards and backwards respectively, it is necessary to displace the cams on the central bands 16B and 16D by $10/4=2.5$ positions, forwards and backwards respectively, and there is thus obtained the mode of arrangement of FIG. 5 which is effectively employed on a speed-counter of the type shown in FIGS. 1 to 3 (in order to show a correspondence of position between the cams in FIGS. 4 and 5, there is indicated in these two figures one cam 17 on each band).

A speed-counter or revolution counter of the type described with reference to FIGS. 1 to 5 can also be employed in a system other than the decimal system for the entire number or only a part of the drums 11. For example, if it is desired to employ certain drums with twelve positions, and in order to continue to employ four circuits per drum, means can be provided for simultaneously actuating three contacts (instead of the maximum of two provided in the case of ten positions to be indicated), the position 11 and 12 being indicated, for example, by the closure of the contacts of series A, B and C on the one hand and A, B and D on the other hand.

It is of course understood that the actual appearance of figures on the drums 11 can be eliminated, as is the case, for example, in FIGS. 1 to 3, the "reading" being effected solely by means of the sets of contacts 18.

Alternatively, instead of employing speed-counters of the step by step movement type provided with cams which operate the closure of sets of contacts, the "reading" of the position of the step by step movement speed-counter, which comprises for each decimal order either four or if necessary, five, peripheral bands with two types of zones, could be effected by photo-electric or magnetic means: the electrical contacts could thus be replaced by a device which permits of a photo-electric reading or a magnetic reading. Thus, if the cams are replaced by white spots on a black drum, a photo-electric cell can be employed for reading. Alternatively the electrical contacts can be replaced by magnetic or variable reluctance reading units comprising zones of a first type constituted by incrustations of ferro-magnetic metal, the zones of the second type being made of non-magnetic ferrous metal.

In an alternative form, in order to determine the position of a shaft to be controlled, there could also be employed two speed-counters or revolution counters of the type mentioned above and driven at the same speed (for example by means of gears), each speed-counter having for each decimal order two peripheral bands, the combined assembly of the two grouped speed-counters comprising nevertheless four bands per decimal order, said four bands co-operating with four sets of contacts as in the form of embodiment which is illustrated. There may also be employed more than two grouped speed-counters.

Finally, in accordance with the principal feature of the present invention, there is obtained with four circuits per decimal order the possibility of distinguishing the different positions of the speed-counter and consequently of the control-shaft with $4n$ circuits and the marking of $10n$ different positions of the shaft to be controlled; for example the marking of 10,000 positions with 16 circuits can thus be effected.

Figure 6:
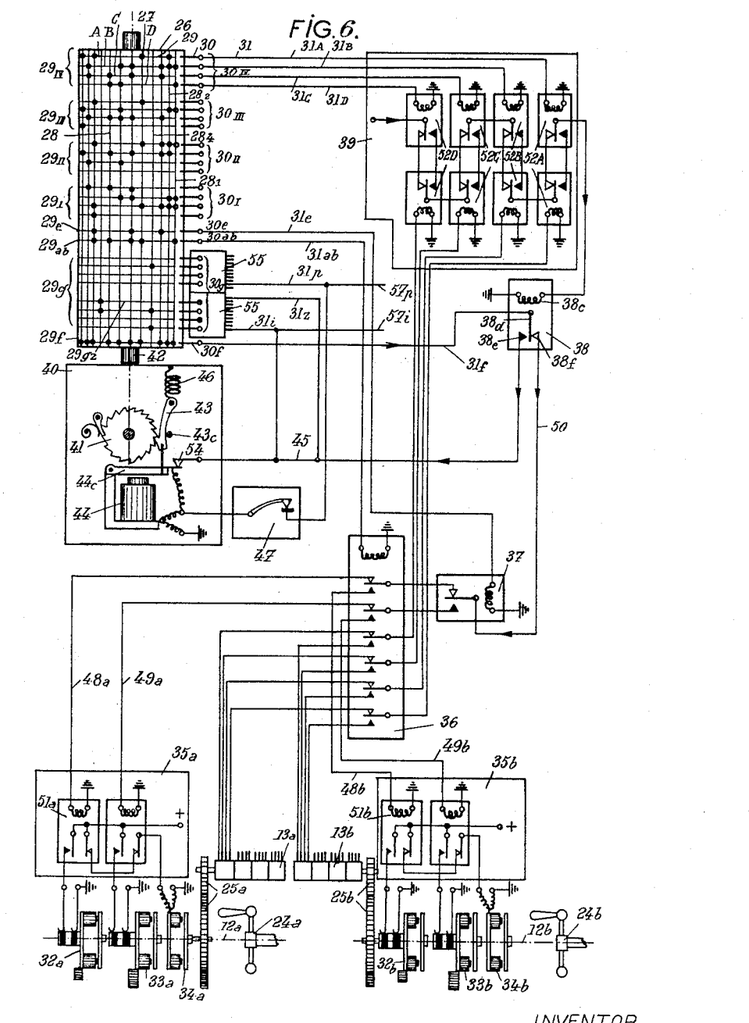
FIG. 6 shows the complete unit of an automatic control device in accordance with a first form of practical operation of the invention, comprising a drum with contact stud cams as a control unit.

A device in accordance with the present invention to effect the automatic control of two cranks $24a$ and $24b$ of the control shafts $12a$ and $12b$ of a machine-tool such as a lathe, by means of the operation of speed-counters $13a$ and $13b$ of the type mentioned above and driven in rotation by said shafts by means of gears $25a$, $25b$, is illustrated in FIG. 6, in which the members which act on the shaft $12a$ carry as references the numbers which are followed by the letter $a$, whilst the corresponding members which act on the shaft $12b$ have a references the same numbers followed by the letter $b$. For example the crank $24a$ can actuate the lead-screw and the crank $24b$ can actuate the traversing shaft.

Figures 7, 9:
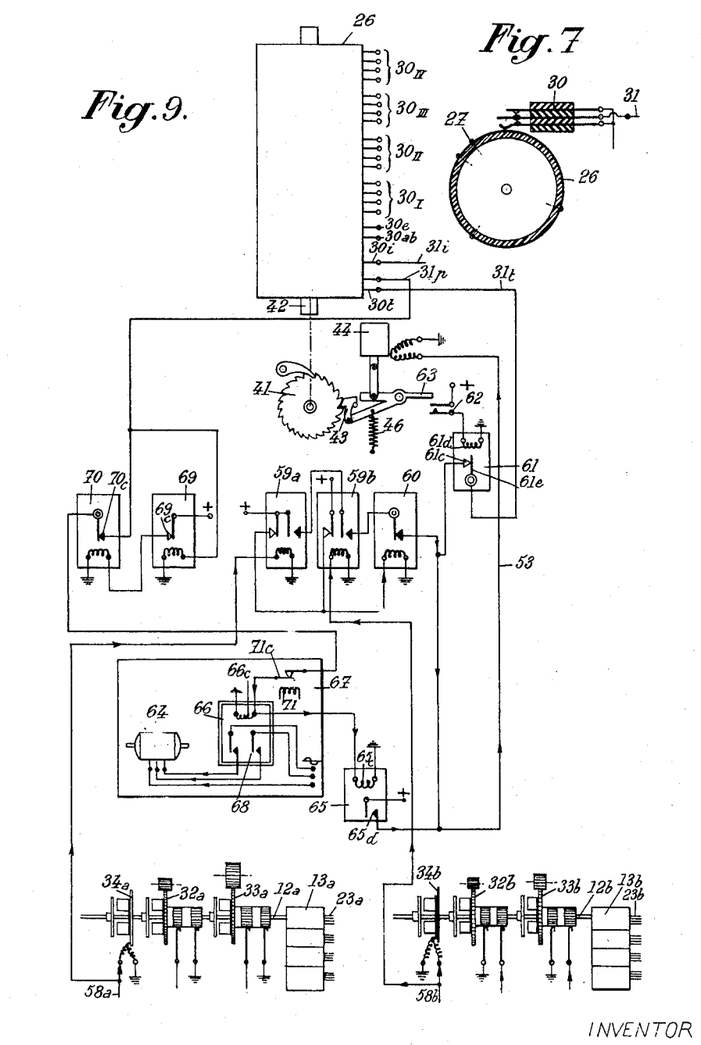
FIG. 7 is a transverse cross-section of the drum with contact-stud cams of the form of embodiment of FIG. 6.
FIG. 9 shows a portion of an automatic control device in accordance with a second form of practical operation of the invention, the control being also effected by a drum with contact-stud cams, namely that which carries out the step by step drive of the drum with contact-stud cams and of the auxiliary operations.

In this form of embodiment, the sequence of operations to be carried out by the machine is previously recorded in coded form on a control drum 26 constituted as shown, for example in FIG. 7, by a hollow cylinder of a plastic material on which are arranged control contact-stud cams 27 constituted by rivets or round-headed screws arranged in line along the generator lines 28 of the cylinder, each generator line corresponding to a pre-determined operation to be carried out by a machine-tool.

In order to control the rotation of a crank 24 and consequently of the tool to a pre-determined position corresponding to a certain indication, in the code employed for each decimal order, such as that of FIG. 5, for example, contact-stud cams 27 are arranged on a generator-line 28 in the positions which represent said indication in the code of FIG. 4 (the passage from the code of FIG. 4 to that of FIG. 5 corresponding to the displacement of the sets of contacts of the counters of FIGS. 1 to 3).

In the case of speed-counters having four decimal orders, the position indications are recorded along sixteen lines 29 on the control drum 26; each line corresponds of one of the sets of contacts 18 of the associated speed-counters $13a$ or $13b$ (the lines $29_I$, $29_{II}$, $29_{III}$, $29_{IV}$, being respectively related to the order of units, tens, hundreds, thousands respectively) and each order of four lines comprises a line A, a line B, a line C and a line D. The drum 26 also comprises supplementary lines and in particular, a line $29ab$ for selection of the speed-counter, and therefore of the shaft to be controlled, a line $29e$ for selection of the direction of rotation to be imparted to said shaft and a line $29f$ which ensures on the one hand, the supply of the means which produce the rotation of said shaft and on the other hand, at the end of the controlled displacement, the rotation of the drum 26 by one step so as to bring the following generator line into the control position in front of the contacts 30.

Finally, the drum 26 comprises a certain number of auxiliary lines $29g$ corresponding to the auxiliary operations (starting up the machine-tool, changes of tools, etc.). These lines can for example be eight in number, as shown in the drawing.

To each line 29 corresponds a set of contacts 30, for example a set of double contacts as shown in FIG. 7 (of the same type as the sets of contacts 18 which co-operate with the speed-counters), which are closed when a contact-stud cam 27 is present on the generator-line which is oppositely facing the line of the sets of contacts 30 (position occupied in FIG. 6 by the generator-line $28_I$).

In order to simplify FIG. 6, only one extremity of line 31 has been shown per contact, assuming that the other extremity is supplied (as shown in FIG. 7); consequently when one set of contacts 30 is closed by a cam 27, the corresponding line 31 is supplied. Also in order to simplify FIG. 6, this latter is provided with connections between the contacts 30 and the speed-counters $13a$ and $13b$ only for a single decimal order, namely that of the thousands, and is only provided with two auxiliary control lines $31_i$ and $31_p$.

The device for the automatic control of a machine-tool in accordance with FIG. 6 additionally comprises driving means 32, 33 so as to permit the driving in rotation in both directions, of each shaft 12 to be controlled, braking means 34 to hold each of the shafts 12 in position, means for causing the driving means 32, 33 to start up in the desired direction, under the control of the lines of selection of the shaft $31ab$ and of the direction of rotation $31e$, by causing said braking means to be made simultaneously inoperative, and means for causing the driving means 32, 33 to stop and for putting into operation the braking means 34 when the position indicated on the operating generator line $28_I$ of the drum 26 is reached by the speed-counter 13 corresponding to the shaft 12 which is actuated. In addition, the control device comprises means for causing the drum 26 to move round one step at the end of each positioning of one control shaft 12 and for carrying out the auxiliary operations.

Firstly as regards the driving and braking means, these latter are provided for each shaft 12, with two electro-magnetic clutches 32, 33 and an electro-magnetic brake 34, each capable of acting on a shaft 12 carrying the crank 24, the rotation of the shaft 12 driving in rotation, as stated above, the corresponding speed-counter 13

(which is of the type shown in FIGS. 1 to 3) by means of gears 25.

The first clutch 22 carries out, when excited, the forward drive at low speed, whilst the second clutch 23, when this latter is excited, serves to effect the drive in reverse at high speed. Similarly, when the brake 34 is excited, this latter locks the shaft 12.

The selection and control of the electro-magnetic clutches and brakes 32, 33 and 34 is carried out by means of relays and lines which essentially comprise a movement selector unit 35 so designed as to keep one of the units 32, 33 and 34 and only one of said units constantly excited, said movement selector unit 35 being controlled through a shaft selector 36 and a selector 37 of direction of rotation, starting from a general control relay 38, the coil $38c$ of which is supplied from the comparator 39 when the position indicated on the generator line $28_I$ corresponds to that of the speed-counter 13, this latter being selected by the selector 36, the moving armature $38d$ of said relay being supplied by the line $31f$.

The combined unit of the line $31f$ and of the general control relay 38 also serve to actuate the step by step advance device of the drum 26 at the end of each unitary displacement of the controlled shaft. With regard to the step by step advance device 40, it is for example of the ratchet wheel type and comprises for this purpose a ratchet wheel 41 which is keyed on the shaft 42 of the drum 26 and is driven in rotation by a pawl 43 (in abutment with a part $43c$) under the action of an electro-magnet 44, the coil unit of which is fed by a line 45 which is connected to the working contact $38e$ of the relay 38 and under the action of a restoring spring 46.

The step-by-step advance device 40 is also controlled at the end of an instantaneous auxiliary operation, by the line $31_i$ or else it is extended by the line $31_p$ across a timing device 47 of the bi-metallic strip type (or a telephone relay or a chronometric time relay) and at the end of the operations by a line $31_z$.

The operation of the device shown in FIG. 6 using relays of the telephone type and control currents of 50 volts is effected as follows.

The drum 26 is in the initial position shown, corresponding to the control of a displacement of one of the shafts:

The line $31ab$ being supplied by virtue of the fact that the line $29ab$ carries a contact-stud cam on the generator line $28_I$, the relay of the selector 36 is excited and it is consequently the shaft $12b$ which is selected;

On the other hand, since the line $31e$ is not supplied (there is no contact-stud cam on the generator line $28_I$ in the line $29e$), the relay of the selector 37 of the direction of rotation is not supplied and it is the line $48b$ which is selected, thus putting the clutch $32b$ into operation and thereby starting the forward rotation of the shaft $12b$ (on the contrary, if the line $30e$ were supplied, the line $49b$ would be selected and this would start up the operation in reverse through the clutch $33b$).

The supply of the clutch selected is effected by the line $31f$ which is always supplied, since for every principal control of movement of a shaft 12, a contact-stud cam 27 is located on the line $29f$. This supply is carried out by the line $31f$, the rest contact $38f$ of the relay 38, the line 50 and the selected line $48b$ (or according to the case, another selected line such as $49b$, $48a$ or $49a$); the selected line $48b$ supplies the corresponding coil $51b$ of the selector unit $35b$, thus exciting the clutch $32b$ and rendering the brake $34b$ inoperative. The shaft $12b$ rotates in forward motion.

It will be noted that the brakes 34 are normally excited as long as no control movement is carried out by the supply of the line 50, since the selectors 36 and 37 choose the coil to be excited of the selection units 35 and consequently choose the clutches $32a$, $33a$, $32b$, $33b$ to be supplied, while the supply of a clutch effects at the same time the de-excitation of the corresponding brake by virtue of the system of connection of the units 35, as illustrated.

The shaft 12 rotates until the relay 38 is excited. This excitation takes place when, in the comparator 39, the relays of each pair of relays 52A, 52B, 52C, 52D produce identical conditions, that is to say when the two coils of a same pair are both simultaneously excited or non-excited so that the armatures of a same pair are both located simultaneously on their rest contact or on their work contact, thus supplying the coil $38c$ by the pairs in contact in series. A correspondence of this kind takes place—not only in the case of the order of the thousands but also in the case of the other orders (these latter are not shown but make use of a similar type of circuit)—when the position of the speed-counter $13b$ is, in the binary code employed, identical to the position indicated on the generator line $28_I$ of the drum 26. When this correspondence takes place, the relay 38 is excited and its armature $38d$ which moves from the rest contact $38f$ to the work contact $38e$ has the following effect:

On the one hand, the supply of the coil $51b$ is cut off, thus de-exciting the motor $32b$ and again exciting the brake $34b$, with the result that the crank $24b$ is stopped in the controlled position;

The excitation, through the line 45, of the electromagnet 44 which attracts its armature $44c$ and consequently the pawl 43 which stretches the spring 46, the ratchet wheel 41 remains motionless during this displacement; the effect of the displacement of the armature $44c$ is to break the contact at 54, thus de-exciting the electro-magnet 44 and permitting the return of the armature $44c$ and of the pawl 43 to the position of rest, under the effect of the restoring spring 46; in this return movement, the ratchet wheel 41 is driven in rotation for one tooth, thus causing the drum 26 to rotate for one step, while the generator line $28_{II}$ comes to occupy the position of operation which was previously that of the generator line $28_I$.

On this occasion, neither of the lines $39e$ and $38ab$ is supplied and it is consequently the line $48a$ with its coil $51a$ which will be supplied; this will result in the forward rotation of the shaft $12a$ by the supply of the clutch $32a$.

Figure 8:
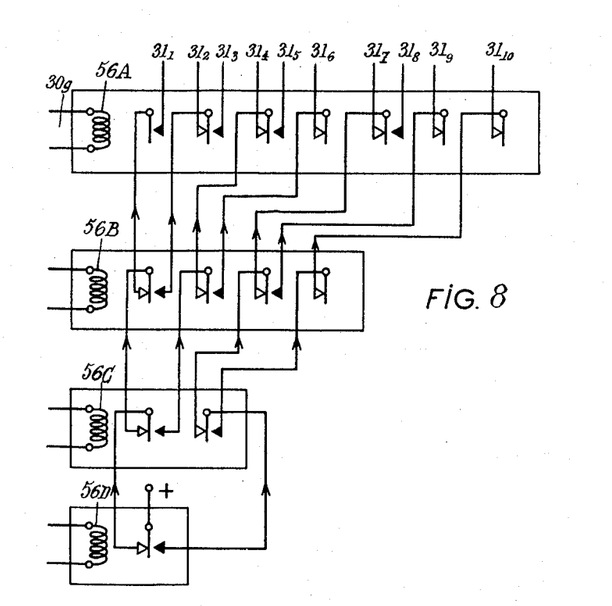
FIG. 8 shows a complete assembly of relays by means of which ten secondary channels can be controlled from four primary channels, for example so as to obtain ten auxiliary controls from four circuits controlled by the drum with contact-cams of FIG. 6.

As regards the auxiliary controls, these latter make use of lines such as $31_i$ and $31_p$ for instantaneous and prolonged controls respectively. The operation passes from the eight lines $30g$ to the twenty lines $31_i$ and $31_p$ by means of two conversion units 55 of the type shown in FIG. 8 in which there are indicated four relays 56A, 56B, 56C and 56D supplied by the lines $30g$. When the relay coil 56A is alone supplied, the line $31_1$ is supplied by four sets of contacts in series. When only the coil 56B is excited, the line $31_2$ is chosen. The lines $31_3$, $31_4$, $31_5$, $31_6$, $31_7$, $31_8$, $31_9$, $31_0$, are supplied in the same manner by exciting the coils 56A and 56B, the coil 56C, the coils 56A and 56C, the coils 56B and 56C, the coil 56D, the coils 56A and 56D, the coils 56B and 56D, and finally the coils 56C and 56D.

Among the lines 31, there can be distinguished the lines $31_i$ by means of which an instantaneous control (for example the starting up of the machine) is carried out under the control of one or two contacts 27 which excite one or two relays 56, the supply of the line $31_i$ having the effect of carrying out on the one hand, the control by means of a line $57_i$ (which actuates a relay, not shown in the drawings, which controls the desired auxiliary operation) and on the other hand, the advance by one step of the drum 26 by supplying the electromagnet 44. As regards an operation requiring a certain length of time, such an operation is controlled by the supply of a line $31_p$ which excites on the one hand through the line $57p$ the relays which effect said prolonged operation (as described below with reference to FIG. 9) and on the other hand, the excitation of the electro-magnet 44; this latter excitation is carried out through a timing device 47 of the bi-metallic strip type which, after a certain time, cuts off the supply of the electro-magnet 44, thus initiating the return of the armature 44c and of the pawl 43 and consequently the rotation of the drum 26, said rotation consequently taking place only at the end of a pre-determined length of time necessary for the prolonged operation, for example for a change of tool. It is understood that a generator line such as 28 corresponding to an auxiliary operation is provided with contacts 27 only on one or two lines $29g$ and the relay 38 is not supplied.

When all the controls which are necessary for the machining of a workpiece have been carried out, the return of the drum to the starting position in order to machine a new piece, said position corresponding to that shown in FIG. 6, is effected by a series of contact-stud cams 27 arranged on the line $29gz$ which controls the line $31z$ (the other lines 29 are not provided with cams 27), thus carrying out the step by step rotation of the drum 26 up to said position by the successive supply of the electro-magnet 44.

The arrangement of the auxiliary controls, and in particular of auxiliary controls requiring a certain length of time, will be explained in detail below, reference being made to FIG. 9, which illustrates an alternative form of the device of FIG. 6 and which also employs a drum 26 with contact-stud cams so as to form the control, and provided with magnetic clutches 32 and 33 for the forward and reverse movements and electro-magnetic brakes 34.

In order to simplify FIG. 9, only a part of the controls has been shown on this latter, the other controls being similar to those of the form of embodiment of FIG. 6.

Neither have there been shown in particular the units which provide the means of selecting the clutch which is put into operation by the contacts $30e$ and $30ab$, nor is there shown the relay-type comparator which controls the de-clutching and the operation of the brake 34 when the position occupied by the speed-counter 13 corresponds to that which is imposed on the contacts $30_I$, $30_{II}$, $30_{III}$ and $30_{IV}$ by the drum 26.

As in the form of embodiment of FIG. 6, all the controls are carried out by telephone-type relays, and the contacts used in these relays send a current of +50 volts into the corresponding circuits.

Normally the brakes 34 of the cranks associated with the shafts 12, are actuated by excitation of their winding by the line 58; as a result, the relays $59a$ and $59b$ are normally excited while the relay 60 with retarded opening is not excited.

When a control is sent by the drum 26 to one of the clutches 32, 33 which is associated with a shaft 12, the line 58 (for example the line $58a$) corresponding to said shaft is no longer supplied, and consequently the corresponding relay 59 (the relay $59a$ for example) is no longer excited; as a result, the excitation of the retarded relay 60 is produced by the rest contact of the relay $59a$. However, the relay 60 does not allow current to pass since the work contact of the relay $59a$ has just been broken. When the control has been carried out, that is to say, when the comparator (which is not shown in the drawings, but is similar to the comparator 39), has verified the identity of the position recorded on the drum 26 with the position occupied by the speed-counter $23a$, the line $58a$ is again supplied and the relay $59a$ is excited.

Across the work contacts of the relays $59a$, $59b$ and 60, the current is sent by the line 53 into the electro-magnet 44. This latter actuates the pawl 43 against the action of the spring 46; the displacement of the pawl 43 takes place without driving the ratchet wheel 41.

Immediately afterwards, the contact of the retarded opening relay 60 is broken, the current is cut off in the electro-magnet 44 and the restoring spring 46 actuates the pawl 43 so as to cause the drum 26 to rotate by one step.

As regards the return of the drum 26 to its starting position when the manufacture of a workpiece has been completed, this return is carried out, according to the form of embodiment of FIG. 26, by a line $31t$ and a relay 61 which is slightly delayed. The line of the drum 26 corresponding to the contact $30t$ in fact comprises a succession of contact-stud cams starting from the generator line corresponding to the last operation to be effected in order to complete the piece to be machined. Each of these contact-stud cams supplies the line $31t$ and consequently, across the rest contact $61c$ of the relay 61 and the line 53, the electro-magnet 44 which displaces the pawl 43 by closing the contact 62 by the arm 63 which is driven at the same time as the pawl 43 during the excitation of the electro-magnet 44. The closure of the contact 62 has the effect of supplying the coil $61d$ of the relay 61, the contact-blade $61e$ of which moves away from the rest contact $61c$ and interrupts the supply of the electro-magnet 44. The pawl 43 returns under the action of the spring 46 and causes the ratchet wheel 41 to advance by one tooth and consequently causes the drum 26 to advance by one step. Since the relay 61 has a slightly retarded opening time, the said relay gives the drum, despite the inertia of the latter, the time to rotate by one step and consequently to present a new contact-stud cam in front of the contact $30t$, thus again exciting the electro-magnet 44 and so forth, until the return of the drum 26 to its starting position. This return of the drum 26 to its starting position is comparable to the automatic return to zero of a telephone selector, apart from the fact that the inertia of the drum requires a slight time-delay of the relay 61.

Thus by simply providing a series of automatic advance contacts on the contact drum there is produced the rotation of said drum on "no-load" after completion of a machining operation, up to the initial position of the controls and the machining of identical workpieces is carried out continuously by the machine-tool which is controlled.

The device which is illustrated in FIG. 9 also makes it possible to provide for auxiliary controls such as the starting of the machine, putting the movement of rotation into reverse, changing speed, changing a tool, changing a machined part, under the control of the same drum 26.

It is necessary to distinguish two types of auxiliary controls, namely, on the one hand, simple or instantaneous controls such as the starting up of a lathe, for which it is sufficient to send an impulse into a corresponding contactor, that is to say to provide simply a contact-stud cam on the line of the drum corresponding to the contact $30_i$ supplying the line $31_i$ having the same function as the line $31_i$ of FIG. 6 and, on the other hand, the prolonged controls which last for a certain time and necessitate the the stoppage of the drum 26 during the whole of this time, for example the control of a tool-change, the chucking of a workpiece, these operations being effected for example, by a rotation during a certain time of a three-phase motor 64, this motor stopping when the control has been completely effected.

For this purpose there can be employed in order to effect the rotation by one step of a drum 26 with cams at the end of the auxiliary operation, a telephone-type relay 65 connected in parallel to the relay-contactor 66 of the control device 67 of the prolonged auxiliary operation, that is to say of the motor 64. In fact the majority of the auxiliary controls necessitate a single control impulse, for example in order to close the contactor 68 of the device 67; thus the drum 26 continuously sends the current through the line $31p$ as long as the said drum remains stationary in a position in which there is provided a contact-stud cam on the line which is located oppositely-facing the contact 30p.

In order to obtain a control impulse for the contactor 68, there are employed two relays 69 and 70 in the form of embodiment of FIG. 9; the line 31p excites the relay 69 and across the work contact 70c of the relay 70, excites the device 67 (for example the coil unit 65c of the relay 65), thus supplying the motor 64 across the contactor 68 which closes.

The relay 70, which is normally excited across the rest contact 69c of the relay 69, remains excited during a short interval of time due to the fact that the relay 69 has a retarded opening time; as a result the current of the line 31p supplies the device 67 until the end of the opening of the relay 70.

When the motor 64 commences to rotate when supplied by the contactor 68, the coil 65c of the relay 65 is also supplied, thus closing the contact at 65d and supplying the electro-magnet 44 which displaces the pawl 43 without driving the drum 26. When the auxiliary operation is completed, the coil 71 is supplied by means which are not shown, thus opening the contact 71c and interrupting on the one hand the supply of the motor 64 which comes to a stop and on the other hand the excitation of the coil 65c which thus cuts off the supply to the electro-magnet 44 and consequently causes the pawl 43 to return and thereby the drum 26 to move forward by one step. The auxiliary operation which lasts for a certain period of time is thus carried out in the desired time under the control of the motor 64.

There has been described in the foregoing the device for actuating the cranks of a machine-tool as controlled by a drum 26. It is of course understood that this drum could be replaced by a band of perforated paper comprising as many lines as said drum, in order to supply the lines 31. There could also be employed a recording on magnetic tape in order to supply the different lines 31.

Figure 10:
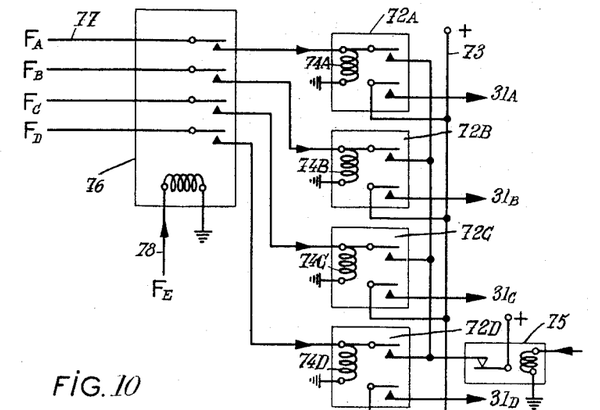
FIG. 10 shows an assembly permitting of automatic control from a recording on a magnetic tape or of remote control by means of push buttons, instead of the automatic control by means of a drum with contact-stud cams of FIGS. 6 or 9.

In FIG. 10 there has been shown a control device for four lines 31, namely the lines 31A, 31B, 31C, 31D corresponding for example to the unit 30$_{IV}$ of FIG. 6 or 9. In this case, four relays such as 72A, 72B, 72C and 72D correspond to each figure drum of the speed-counters. When one or a number of said relays is excited by an impulse F$_A$, F$_B$, F$_C$, F$_D$, sent by the recording machine, the said relay remains closed on account of the fact that it is supplied by the line 73 and the corresponding holding coil 74 until the corresponding control has been completely carried out, which then causes said relay to open by means of the relay 75, the action of which is similar to that of the electro-magnet 44 of FIGS. 6 and 9 (which caused the drum 26 to move round by one step). The choice of the drums of the speed-counters as well as the speed-counter itself is effected for example by means of switching relays such as the relay 76 operated by a frequency F$_E$.

The tape-recorder which provides the impulses F$_A$, F$_B$, F$_C$, F$_D$, as well as the switching frequencies such as F$_E$ can be a magnetophone having a number of tracks, an impulse frequency being recorded on each track, or else a magnetophone having a single track and in this case, there can be recorded on the single track a number of different frequencies which are separated by suitable filters before reaching the relay 76.

The circuit of FIG. 10 makes it also possible to carry into effect the remote control of a device in accordance with FIG. 6 or 9 by means of push-buttons, the effect of said push-buttons being to supply the lines 77 and 78 in such manner as to supply one or two lines 31.

An automatic control or remote control device in accordance with the present invention can additionally comprise means for effecting the slowing-down of the drive of the shafts 12 before reaching the position indicated on the drum 26 (or the control unit acting on the lines 77).

In fact it is an advantage not to cause the abrupt stopping of the rotation of the shafts 12 but to slow down said rotation just before it is stopped, in order to increase the precision of the control. To this end, there can for example be employed a comparator 39 in which, as soon as the correspondence is achieved for the thousands, hundreds and tens (to the nearest unit either forwards or backwards) and before correspondence of position has taken place for the units, a current which passes through auxiliary contacts of the relays of the comparator produces a change of speed (slowing-down) of the motor 32 or 33 which controls the movement.

In a device of this type, there can also be provided means for taking up play, wear of the tools and the differences between the positions of the different tools successively controlled by the device, thus preventing errors of machining.

As will be understood and since it already follows in any case from the foregoing description, the present invention is in no way limited either to its methods of application or to the forms of embodiment of the various constituent parts of the invention which have been more especially contemplated; on the contrary, all alternative forms are intended to come within the scope of the present invention.

What we claim is:

1. A device for the automatic control and remote control of a machine tool for the machining of a workpiece by successive displacements of at least one tool with respect to the workpiece or of said workpiece with respect to the tool, comprising at least one mechanical revolution counter to mark the possible position of said tool with respect to said workpiece, a control unit adapted to pre-determine the successive positions to be occupied by said tool with respect to said workpiece at the end of each displacement, driving means for displacing said tool with respect to said workpiece towards the position corresponding to the indications provided by said control unit, and means for stopping with precision the displacements of said tool with respect to said workpiece when the indications of said at least one counter are identical to those of said control unit, in which said at least one counter is of the roller type with step-by-step movement and provided for each decimal order with less than ten peripheral control bands and preferably four to five peripheral bands, each comprising ten zones, certain zones being of a first type while the others are of a second type, and further comprising stationary reading units adapted to cooperate with each said counter for reading said first zones, the number of said reading units being at least equal to the number of said peripheral bands, and means comprised in each said reading unit for operating an electric circuit when a zone of the first type passes in front of said reading unit.

2. A device as claimed in claim 1, in which said control unit is constituted by a cylindrical drum rotatable about its axis and provided with contact-stud cams, said cams being located along the generator lines of said drum and being adapted to produce the successive indications which determine the successive displacements of the tool with respect to the piece to be machined, in addition to all the auxiliary operations for the automatic control of said machine tool, a series of contacts, fixed during the execution of the machining operation and adapted to be operated by the contact stud cams of said drum, said cams having pre-determined positions with respect to said contacts, and means for causing said drum to rotate by one step after each displacement of said tool with respect to the workpiece and after each said auxiliary operation, so as to bring a new generator line of said drum into said pre-determined position.

3. A device as claimed in claim 1, in which said control unit is constituted by a band of perforated paper co-operating with fixed contacts adapted to be operated by the perforations of said band which are located on a column having a determined position with respect to said fixed contacts, and means for advancing said band by one step at the end of each displacement of said tool with respect to the workpiece and after each auxiliary operation, so as to bring a new column of said band into said predetermined position.

4. A device as claimed in claim 2, in which, in order to effect an auxiliary control requiring a certain length of time, said device comprises a time delay relay unit which converts a direct current into an impulse capable of actuating a relay coil, a control unit for said operation comprising an actuating relay the coil of said relay being connected to said unit so as to receive said impulse, means for interrupting the connection between said units after completion of said operation, and a control unit operated simultaneously with said interruption means and adapted to operate the means for causing said drum to rotate by one step.

5. A device as claimed in claim 1, in which said control unit comprises a magnetophone or tape recorder, means for simultaneously recording signals of musical frequencies on said tape recorder, electric filter means for separating said signals during the reproduction, and actuating relays connected to the circuits of said at least one counter which control the displacement of the tools with respect to the workpieces, and a plurality of further relays for executing auxiliary orders required for the automatic working of the machine tool, said recording means for said musical signals comprising a number of electric oscillators supplying currents of different frequencies, and numerator buttons of the kind employed in telephone systems to replace telephone calling-dials.

6. A device as claimed in claim 1, in which the recording and reproduction of the control currents are produced by means of a magnetophone having a plurality of magnetic heads and by a corresponding plurality of parallel recording tracks on the magnetic tape of said magnetophone, independent electric circuits being employed to separate the different control currents.

7. A device as claimed in claim 1, in which said means for stopping with precision the displacements of the tool with respect to said workpiece when the indications of said at least one counter are identical to the indicated displacements comprise an indicating comparator provided with as many circuit units in series as there are peripheral bands, each of said units becoming electrically conducting only when the electric circuit associated with the corresponding peripheral zone and the corresponding electric circuit operated by said control unit are both energized or both non-energized, and a control unit set in operation by the passage of current through said comparator so as to render non-operative the driving means for displacing the tool and to put into operation a brake which respectively causes the stoppage of said tool and said workpiece.

8. A device as claimed in claim 1, in which the zones of the first type are constituted by cams directly operating electric contacts comprised by said reading units for reading the indications of each said counter, said contacts being of the flexible blade type mounted on stationary supports.

9. A device as claimed in claim 1, in which the zones of the first type on the drums of each said counter are constituted by regions having optical properties which differ from those of the zones of the second type, and in which said reading units co-operating with said zones comprise fixed photoelectric cells.

10. A device as claimed in claim 1, in which the zones of the first type on the drums of each said counter have magnetic properties which are different from those of the zones of the second type, and in which said reading units co-operating with said zones are magnetic heads.

11. Position indicator of the relative position of a workpiece and a tool for the automatic and remote control of machine-tools comprising: a mechanical revolution counter of the rotating rollers type with step-by-step rotation motion, said counter being provided, for each decimal order, with four to five peripheral bands driven simultaneously in rotation, each band comprising ten zones, certain zones being of a first kind and the other zones being of a second kind so as to determine, for each decimal order, ten regularly angularly displaced different patterns on said bands; and at least one stationary reading unit for each peripheral band, each reading unit being adapted to be influenced by the presence of a zone of the first kind on the associated peripheral band and to operate an electric circuit in response to such presence.

12. Position indicator as claimed in claim 11, wherein said zones of a first kind carry a boss, wherein said zones of a second kind are deprived of boss and wherein each said stationary reading unit comprises at least one electric contact adapted to be closed by the presence of a boss on the associated peripheral band in front of said contact.

References Cited in the file of this patent

UNITED STATES PATENTS

| | | |
|---|---|---|
| 2,597,866 | Gridley | May 27, 1952 |
| 2,748,665 | Senn | June 5, 1956 |
| 2,798,994 | Dicke | July 4, 1957 |
| 2,814,443 | Mills | Nov. 26, 1957 |
| 2,823,345 | Ragland | Feb. 11, 1958 |
| 2,852,764 | Frothingham | Sept. 16, 1958 |
| 2,882,864 | Booth et al. | Apr. 21, 1959 |
| 2,907,938 | Hodgers et al. | Oct. 6, 1959 |
| 2,946,938 | Gavrean et al. | July 26, 1960 |